United States Patent [19]

Calamari

[11] Patent Number: 4,821,171
[45] Date of Patent: Apr. 11, 1989

[54] SYSTEM OF SELECTIVE PURGING OF ADDRESS TRANSLATION IN COMPUTER MEMORIES

[75] Inventor: Carroll A. Calamari, Fitchburg, Mass.

[73] Assignee: Prime Computer, Inc., Natick, Mass.

[21] Appl. No.: 233,884

[22] Filed: Aug. 15, 1988

Related U.S. Application Data

[63] Continuation of Ser. No. 731,716, May 7, 1985, abandoned.

[51] Int. Cl.⁴ .............................................. G06F 12/10
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,761,881 | 9/1973 | Anderson et al. | 364/200 |
| 3,829,840 | 8/1974 | Birk et al. | 364/200 |
| 3,938,100 | 2/1976 | Steiner | 340/172.5 |
| 3,976,978 | 8/1976 | Patterson et al. | 340/172.5 |
| 4,053,948 | 10/1977 | Hogan et al. | 364/200 |
| 4,084,225 | 2/1978 | Anderson et al. | 364/200 |
| 4,084,226 | 2/1978 | Anderson et al. | 364/200 |
| 4,084,227 | 2/1978 | Bennett et al. | 364/200 |
| 4,279,014 | 7/1981 | Cassonnet et al. | 364/200 |
| 4,388,685 | 6/1983 | Kotok et al. | 364/200 |
| 4,463,420 | 7/1984 | Fletcher | 364/200 |
| 4,513,367 | 4/1985 | Chan et al. | 364/200 |
| 4,587,610 | 5/1986 | Rodman | 364/200 |

Primary Examiner—Gareth D. Shaw
Assistant Examiner—Kevin A. Kriess
Attorney, Agent, or Firm—Wolf, Greenfield & Sacks

[57] ABSTRACT

When data is subject to relocation in the physical memory of a processing system employing a virtual memory architecture, execution of programs can be greatly improved through the use of a validation code generator, which assigns a code to each virtual-to-physical address translation prior to its entry in the address translation system. Whenever a page in memory is replaced or the buffer is purged for memory management purposes, the code generator proceeds to another code and assigns this new code to subsequent entries.

8 Claims, 1 Drawing Sheet

SYSTEM OF SELECTIVE PURGING OF ADDRESS TRANSLATION IN COMPUTER MEMORIES

This application is a continuation, of application Ser. No. 731,716, filed May 7, 1985.

BACKGROUND OF THE INVENTION

The present invention is in the field of data processing and, in particular, relates to high speed auxiliary memories.

An architecture called virtual memory is employed in many data processing systems where service is provided to a number of users. Typically, virtual memory is divided into segments, each of which is further divided into pages with each page accomodating a predetermined maximum number of words. In a number of systems, for example the Series 50 systems manufactured by Prime Computer, Inc. of Natick, Mass., the addresses of the segments and pages are allocated by an operating system and can be arranged in a medium density physical memory in a random fashion. To the user, however, an appearance of continuity and unlimited memory space is presented and the user need not be concerned with the actual interleaved nature of programs in the main memory.

Because of the distributed reality of programs within the physical memory as well as the time and energy necessary to retrieve data from the memory, it is also preferred to employ a smaller auxiliary memory or data cache to store data which is likely to be needed by the user at a particular time. For this purpose, a data cache formed from Random Access Memory (RAM) units is often employed. One convenient method for loading a data cache is to store data according to the lower order virtual address bits. For example, in a small data cache an entry at location 5 of a user's virtual page will be stored at location 5 in the data cache. However, this scheme alone does not assure that data retrieved from a particular location in the cache will be valid because data from two or more users can be assigned the same virtual address and a small data cache loaded in this fashion may not distinguish between the virtual pages of multiple users.

In order to validate data from the cache, an address translation is performed using an address tag (which is obtained along with the data from the cache when it is accessed) and an address translation element which is also most often implemented in RAM hardware. One known structure is called a lookaside buffer and essentially operates by storing main memory addresses and confirmation tags. When the lookaside buffer is accessed with a virtual address, it returns a physical address and a tag to confirm the virtual address. If the physical address in the lookaside buffer does not match the address tag associated with the data, a data cache miss occurs (i.e., the data in the cache is from a different page) and the physical address from the lookaside buffer is used to retrieve the proper data from the main memory.

Periodically, it is necessary to purge the address translation element because the physical locations of the data in the medium density memory are changed. For example, when all the pages in the medium density memory are allocated, pages must be loaded out to a higher density physical memory such as a disk. When this occurs, the translation element may contain stale entries. Since selective revision of the entries in the address translation element is very time consuming (because all the entries must undergo a comparison to determine locations to be invalidated), it typically is more efficient to purge the translation element altogether. However, purging of the translation element is also time-consuming, albeit less so than selective revision, since a write command must be executed for each entry in a lookaside buffer or equivalent translation element. In systems that employ large translation buffers (e.g. 128 or more locations), purging can have a serious effect on system performance.

There exists a need for better address translation systems. In particular, a system that eliminates or reduces the penalty for complete purging of buffers or similar elements storing virtual-to-physical address translations would satisfy a long felt need in the industry.

SUMMARY OF THE INVENTION

When data is subject to relocation in the physical memory of a processing system employing a virtual memory architecture, execution of programs can be greatly improved through the use of a validation code generator, which assigns a code to each virtual-to-physical address translation prior to its entry in the address translation system. Whenever a page in memory is replaced or the buffer is purged for memory management purposes, the code generator proceeds to another code and assigns this new code to subsequent entries.

In the illustrated embodiment a comparator is employed with the code generator to take entries as they are needed and compare the associated codes with the current state of the code generator. If the codes match, the translation is valid; however, if the codes do not match, the translation is stale and must be replaced with a new translation. In this manner only translations that are actually needed become updated. Purging becomes a very fast and efficient operation.

Since the sequence of different codes is finite, the translation storage element must eventually be purged after the last code of the sequence has been assigned. Nonetheless for a three bit code, the need to purge the lookaside buffer or equivalent element is reduced to one instance in seven. Similarly, with a four bit code, the buffer needs to be cleared only one time in fifteen. In one embodiment the code generator can be implemented by a simple counter. Alternatively, the code operator can generate non-consecutive bit sequences (e.g. a Grey code).

The invention will next be described in connection with certain illustrated embodiments. However, it should be clear that various changes, additions and subtractions can be made without departing from the spirit or scope of the invention. For example, although the illustrated embodiment discloses and employs a hashing algorithm and encoder to load and access the address translation buffer (to increase the number of different address translations stored in the buffer), the invention can also be practiced with a translation buffer that is not filled by a hashing algorithm. Similarly, the size of data cache and buffer can be varied without affecting the improvements disclosed herein. Various methods can be employed to generate the validation code. Likewise, the length of the validation code is variable and the comparison method employed for validation can be implemented in various manners.

BRIEF DESCRIPTION OF THE DRAWINGS

The FIGURE is a schematic block diagram of the address translation system of the present invention incorporated into a particular memory system.

DETAILED DESCRIPTION

Figure 1:
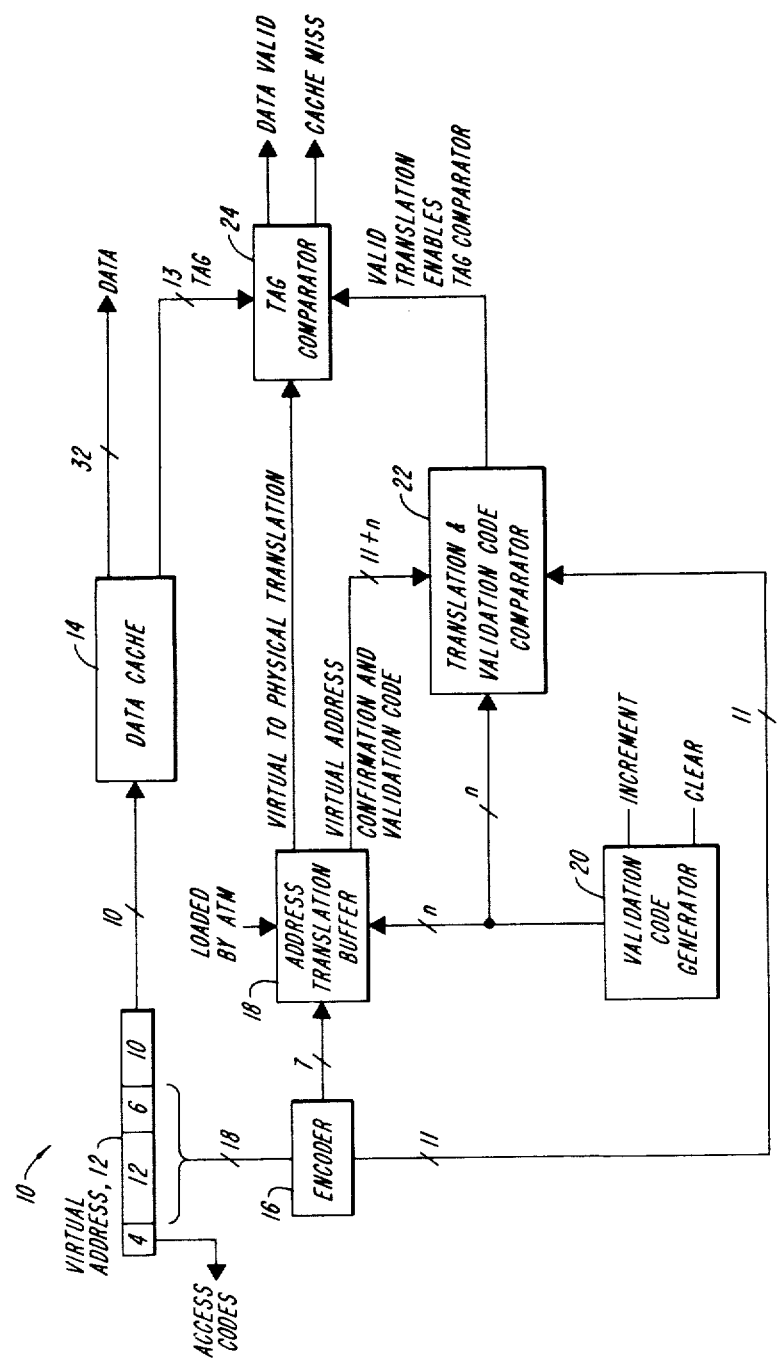

In the FIGURE, A schematic block diagram of an auxiliary memory system 10 includes a data cache 14, an encoder 16, an address translation buffer 18, a validation code generator 20, a translation and validation code comparator 22, and a data tag comparator 24. In function, the data cache 14, encoder 16 and address translation buffer 18 in the illustrated embodiment are similar to corresponding elements in the Series 50 systems manufactured by Prime Computer, Inc., Natick, Mass.

In the illustrated embodiment, a thirty-two bit wide virtual address is used to access the auxiliary memory system 10. The virtual address 12 is used by system 10 to retrieve data stored in cache 14 and to verify its validity. As described in more detail below, the lowest ten bits of the virtual address are identical to the lowest ten bits of the corresponding physical address and are used to prompt the data cache 14 directly. The next eighteen bits of the virtual address provide the information necessary to obtain the page and segment numbers of the physical address. The final four bits of the virtual address relate to access codes that are not important to the understanding of the present invention.

In the embodiment shown in the figure, the data cache 14 can be a 1024 location random access memory where each of the word locations includes a tag portion (in this instance thirteen bits wide) and an associated data portion (thirty-two bits wide). The cache 14 is formatted such that the word number (i.e., address) of each word stored in succession in the cache memory is representative of (and in the illustrated embodiment, identical to) the ten low-order bits of its physical address and define the word location within a page in the main memory. That is, each data cache entry fully specifies a location in main memory (the word number and the tag bits), and the contents of that location. In operation, the cache is designed to make this information available to the processor, on request, on a high speed basis.

The encoder 16 performs a hashing function on the higher order bits of the virtual address 12 to obtain an address for prompting address translation buffer 18. In the illustrated embodiment, the eighteen virtual address bits which define the page and segment location of a particular data word are encoded by encoder 16 into a seven bit abbreviated address. An identical encoding method is used to load the "translations" into address translation buffer 18.

Buffer 18 is also implemented in random access memory and can be, for example, 128 locations deep. Each location must be wide enough to store a physical address (i.e., thirteen bits in the illustrated embodiment corresponding to the tag bits of the data cache), an "n"-bit wide validation code (discussed in more detail below) and also enough of the virtual address to confirm the translation. (Since in the embodiment of FIG. 1, eighteen bits are "hashed" into a seven bit abbreviation which addresses buffer 18, the buffer 18 also stores eleven bits of the virtual address to ensure that the hashed virtual address is correct). The eleven plus "n" bits thus are used to determine whether the translation is for the right page and the entry is still valid. It should be appreciated that various other hashing or encoding schemes can be practiced with the present invention as well.

According to the present invention a code generator 20 is provided to generate a series of n-bit wide validation codes, where n is 2 or greater. The codes are stored in the buffer 18 along with the translation entries. The generator 20 assigns the same code to each new entry until purging of the buffer 18 is required. The purge triggers the code generator 20 to advance to its next state and then assign the next code in its series to subsequent entries into the buffer 18.

The translation and validation code comparator 22 can be implemented by conventional comparator hardware. In the illustrated embodiment translation comparator 22 compares the eleven virtual address confirmation bits of the addressed buffer entry with the corresponding eleven bits from the virtual address 12 and also compares the n validation code bits of the buffer entry with the n-bit code currently being generated by the code generator 20. The comparator 22 produces a valid translation signal when both sets of bit strings match. It should be clear that the translation comparison and the validation code comparison functions can also be performed separately by different hardware. However, a combination comparator such as illustrated comparator 22 will typically be more efficient.

In the illustrated embodiment a tag comparator 24 is also employed and can likewise be implemented by conventional hardware. Data tag comparator 24 is enabled by the valid translation signal from comparator 22. In the tag comparator 24 the thirteen bit physical address from buffer 18 is compared with the thirteen bit tag which was stored in the cache 14. If these bit strings also match, the data in cache 14 is valid and can be read by a processor (not shown) and operated upon. If the tags do not match, the data in the cache 14 is from a different page of the user's memory and the proper data must be fetched from one of the higher density memory components using the address available from buffer 18.

When an address translation is not found in the buffer 18 (i.e., the confirmation tag does not match the virtual address or the validation code is stale when the two are compared in comparator 22), a routine in the operating system called an address translation mechanism (ATM) or a similar procedure typically takes over and calculates the physical address. In systems that employ segmentation tables as part of their virtual address architecture, the system stores the information on segments, access rights, page allocations, etc., and from this information, determine the physical address. The combination of ATM calculations and new entries replenish the buffer 18 with valid translations in an efficient manner without resort to any general modification of the buffer's contents.

Purging of the buffer 18 is accomplished, for example, by rewriting the validation code for each entry to read "0" when the validation code generator 20 has been sequenced through its entire set of codes.

Having disclosed a novel address translation system for computer memories; modifications, additions and subtractions are intended to be covered by the following claims.

What is claimed is:

1. An address translation system for use in a data processing system which employs virtual addressing for referencing a physical memory, said processing system comprising:

A. translation buffer means for storing a plurality of entries, which entries are accessed by virtual addresses to yield a translation word comprised of the physical memory location and a series of tag bits indicating the corresponding virtual memory address, B. data cache means for storing data words that are used by the data processing system and outputting said word in response to the input of a virtual address from the data processing system, said data words comprising a series of tag bits for indicating the physical memory address of the data, C. validation code generator means for generating a sequence of validation codes, each code being defined by a unique series of at least two validity bits, and for storing one of said codes in said translation buffer means in association with each entry, D. control means for activating said generator means when said data processing system requires invalidation of existing entries in said translation buffer means, E. first comparator means having at least two input terminals and an output terminal and including separate conductor means for coupling from said translation buffer means and said validation code generator means, respectively, to said input terminals and for comparing the validation code of an entry in the translation buffer means with the code currently being generated by the validation code generator means to determine whether said entry is still valid, and outputting at said output terminal a valid translation signal if the codes match, and F. second comparator means having at least three input terminals and an output terminal and including separate conductor means for respectively coupling from said first comparator output terminal to a first input terminal so as to be enabled by the output of said valid translation signal, coupled from said data cache means to a second input terminal, and translation buffer means to a third input terminal for comparing the tag bits from the data cache means with the tag bits from the translation buffer means and outputting a data "valid" signal if said tag bits match and a cache "miss" signal otherwise.

2. A system of claim 1, including an encoder means for coupling virtual address bits to said translation buffer means for loading and retrieving translations, and means coupling said encoder means to said first comparator means.

3. The system of claim 1, wherein the system further comprises means for reinitializing said translation buffer means when said generator means has generated its sequence of validation codes.

4. The system of claim 1 wherein the system also includes a searching means for determining translations not found in said translation buffer means and for entering such new translations in said buffer means in association with the validation code currently being generated by said counter means.

5. The system of claim 1 wherein the generator means is a counter element which is incremented by said control means whenever the location of data in said physical memory is changed.

6. The system of claim 5 wherein the system further comprises initializing means for clearing said counter and for purging said translation buffer means when said counter has generated its sequence of validation codes.

7. The system of claim 1 wherein the buffer means further comprises a hashing means for loading and retrieving translations by encoding a set of address bits into a smaller, coded set of bits.

8. A system for retrieving data from an auxiliary memory in a data processing system having a larger main memory and which employs virtual addressing for referencing memory, comprising:

means for supplying a virtual address to the system;

an encoder having an input coupled to the means for supplying a virtual address, for hashing the virtual address and having a first output for supplying the hashed virtual address and a second output for supplying confirmation bits of the hashed virtual address;

an address translation buffer for storing a plurality of entries, each entry accessed by a hashed virtual address and having an input coupled to the first output of the encoder, a second input for receiving a validation code, a first output for supplying physical memory location corresponding to the virtual address and at a second output for supplying a series of bits indicating the corresponding virtual address and validation code;

a validation code generator for generating a sequence of validation codes, each code being a unique series of, at least two, validity bits and having an output coupled to the address translation buffer to supply a validation code for each entry in the address translation buffer;

control means for causing the validation code generator to generate the next code in the sequence when the data processing system requires invalidation of existing entries in the address translation buffer;

a data cache for storing a plurality of data words, having an input coupled to the means for supplying a virtual address each data word accessed by a virtual address from the data processing system, said data cache outputting at a first output, a series of tag bits for indicating the physical address of the data and, at a second output, data for the data processing system;

a first comparator having a first input coupled to the output of the validation code generator, a second input coupled to the second output of the encoder and a third input coupled to the second output of the address translation buffer, said first comparator comparing the second output of the address translation buffer with the high order virtual address bits from the encoder and the validation code currently generated by the validation code generator, and further having an output which outputs a valid translation signal if a match is detected; and second comparator means having a first input coupled from the output of said first comparator so as to be enabled by the valid translation signal from said first comparator and having a second input coupled from the first output of said address translation buffer and a third input coupled from the first output of said data cache, said second comparator outputting a data valid signal when enabled and the second and third inputs match.

* * * * *